US012718082B1

(12) United States Patent
Anschel et al.

(10) Patent No.: US 12,718,082 B1
(45) Date of Patent: Aug. 25, 2026

(54) ENTITY TYPE BASED LOCATION DETECTION FOR DOCUMENT CONTENT ANALYSIS

(71) Applicant: Amazon Technologies, Inc., Seattle, WA (US)

(72) Inventors: Oron Anschel, Haifa (IL); Shahar Tsiper, Haifa (IL); Shai Mazor, Binyamina (IL); Jonathan Wu, Seattle, WA (US); Meng Wang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 519 days.

(21) Appl. No.: 16/843,807

(22) Filed: Apr. 8, 2020

(51) Int. Cl.
*G06N 3/08* (2023.01)

(52) U.S. Cl.
CPC .................................... *G06N 3/08* (2013.01)

(58) Field of Classification Search
None
See application file for complete search history.

(56) References Cited

U.S. PATENT DOCUMENTS 5,052,043 A 9/1991 Gaborski
5,475,768 A 12/1995 Diep et al.
5,542,006 A 7/1996 Shustorovich et al.
5,835,633 A * 11/1998 Fujisaki ............ G06V 30/2504 382/187
5,912,986 A 6/1999 Shustorovich
7,499,588 B2 3/2009 Jacobs et al.
9,501,708 B1 * 11/2016 Ahmad ............... G06V 30/245
9,646,230 B1 5/2017 Prulhiere et al.
10,262,235 B1 * 4/2019 Chen ............... G06V 30/19173
10,354,168 B2 7/2019 Bluche
10,489,682 B1 11/2019 Kumar et al.
10,671,878 B1 * 6/2020 Sarshogh ............ G06K 9/6256
11,354,485 B1 * 6/2022 O'Gorman ........... G06V 30/414
2007/0065003 A1 * 3/2007 Kellerman ......... G06V 30/1423 382/181
2014/0126823 A1 * 5/2014 St. Jacques .......... G06V 30/373 382/187
2015/0302242 A1 * 10/2015 Lee ....................... G06F 40/171 382/189
2018/0137350 A1 5/2018 Such et al.
2018/0218170 A1 * 8/2018 Abi Antoun ........ H04L 63/1408
2019/0026550 A1 * 1/2019 Yang .................... G06K 9/6256

(Continued)

OTHER PUBLICATIONS

Y Fujii et al. Sequence-to-Label Script Identification for Multilingual OCR. Aug. 17, 2017. arXiv. [retrieved from internet on Sep. 22, 2022] <URL: https://arxiv.org/abs/1708.04671> (Year: 2017).*

(Continued)

*Primary Examiner* — Bion A Shelden
(74) *Attorney, Agent, or Firm* — Robert C. Kowert; Kowert, Hood, Munyon, Rankin & Goetzel, P.C.

(57) ABSTRACT

A machine learning model is trained to detect candidate locations of instances of entity types within a document. The model comprises region-based convolutional neural networks with classifier layers corresponding to the entity types. A trained version of the model is stored. In response to a programmatic request, an indication of contents of a target document is provided using at least the trained version of the model.

20 Claims, 9 Drawing Sheets

(56) References Cited

U.S. PATENT DOCUMENTS

| | | | | |
|---|---|---|---|---|
| 2019/0050639 | A1* | 2/2019 | Ast | G06V 10/82 |
| 2019/0228269 | A1* | 7/2019 | Brent | G06V 10/82 |
| 2019/0258854 | A1* | 8/2019 | Hosabettu | G06V 30/414 |
| 2020/0042825 | A1* | 2/2020 | Nguyen | G06N 3/044 |
| 2020/0327360 | A1* | 10/2020 | Samala | G06V 30/413 |
| 2021/0042516 | A1* | 2/2021 | Panakkal | G06V 30/147 |
| 2021/0129340 | A1* | 5/2021 | Babikian | B25J 15/00 |
| 2021/0312134 | A1* | 10/2021 | Creed | G06N 3/096 |

OTHER PUBLICATIONS

Y Nagaoka et al. Text Detection by Faster R-CNN with Multiple Region Proposal Networks. 2017 14th IAPR International Conference on Document Analysis and Recognition (ICDAR), 2017. [retreieved from internet on Sep. 22, 2022] <URL: https://ieeexplore.ieee.org/abstract/document/8270290> (Year: 2017).*

MI Sarker and H Kim. Farm land weed detection with region-based deep convolutional neural networks. Jun. 5, 2019. arXiv. [ retrieved from internet on Sep. 22, 2022] <URL: https://arxiv.org/abs/1906.01885> (Year: 2019).*

P Yuan et al. "Faster R-CNN with Region Proposal Refinement" [archived on Sep. 18, 2017] [retrieved on Dec. 2, 2023] <URL: https://web.archive.org/web/20170918134532/http://cs231n.stanford.edu/reports/2017/pdfs/112.pdf> (Year: 2017).*

S Ren et al. Faster R-CNN: Towards Real-Time Object Detection with Region Proposal Networks. arXiv. Jan. 6, 2016. <URL: https://arxiv.org/pdf/1506.01497> (Year: 2016).*

YW Chao et al. Rethinking the Faster R-CNN Architecture for Temporal Action Localization. arXiv. Apr. 20, 2018. <URL: https://arxiv.org/pdf/1804.07667> (Year: 2018).*

A Ammar et al. Aerial Images Processing for Car Detection using Convolutional Neural Networks: Comparison between Faster R-CNN and YoloV3. arXiv. Oct. 16, 2019. <URL: https://arxiv.org/pdf/1910.07234v1> (Year: 2019).*

ZC Fei. Better Understanding Hierarchical Visual Relationship for Image Caption. arXiv. Dec. 4, 2019. <URL: https://arxiv.org/pdf/1912.01881> (Year: 2019).*

X Sun et al. Hierarchical Visual Relationship Detection. Oct. 2019. ACM Multimedia 2019 <URL: https://dl.acm.org/doi/pdf/10.1145/3343031.3350921> (Year: 2019).*

Shaoqing Ren, et al., "Faster R-CNN: Towards Real-Time Object Detection with Region Proposal Networks", arXiv:1506.01497v3, Jan. 6, 2016, pp. 1-14.

Ross Girshick, et al., "Rich feature hierarchies for accurate object detection and semantic segmentation Tech report (v5)", arXiv 1311.2524v5, Oct. 22, 2014, pp. 1-21.

Ross Girshick, et al., "Selective Search for Object Recognition", Technical Report 2012, submitted to IJCV, Retrieved from http://disi.unitn.it/~uijlings/SelectiveSearch.html, pp. 1-14.

* cited by examiner

*FIG. 5*

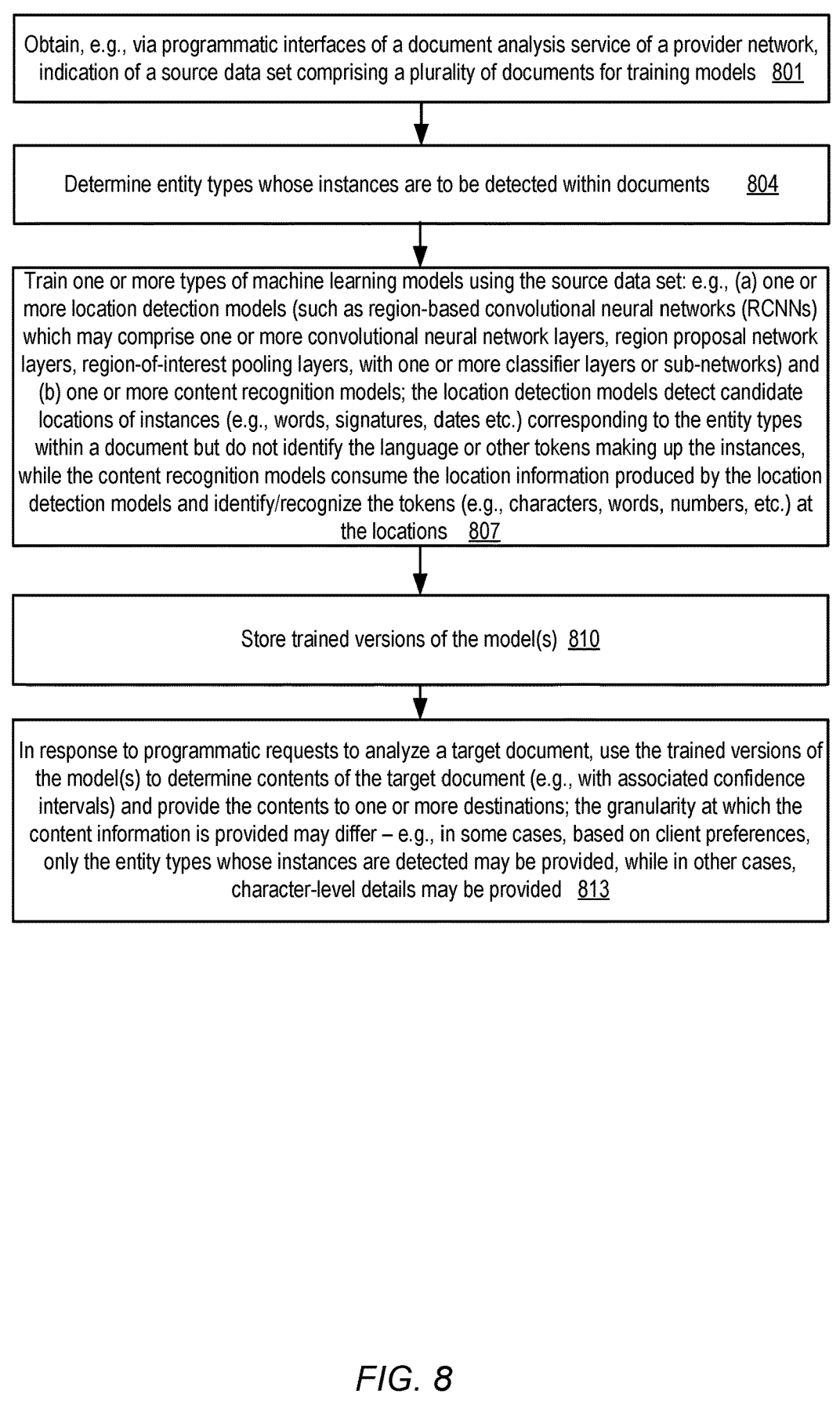

Obtain, e.g., via programmatic interfaces of a document analysis service of a provider network, indication of a source data set comprising a plurality of documents for training models 801

Determine entity types whose instances are to be detected within documents 804

Train one or more types of machine learning models using the source data set: e.g., (a) one or more location detection models (such as region-based convolutional neural networks (RCNNs) which may comprise one or more convolutional neural network layers, region proposal network layers, region-of-interest pooling layers, with one or more classifier layers or sub-networks) and (b) one or more content recognition models; the location detection models detect candidate locations of instances (e.g., words, signatures, dates etc.) corresponding to the entity types within a document but do not identify the language or other tokens making up the instances, while the content recognition models consume the location information produced by the location detection models and identify/recognize the tokens (e.g., characters, words, numbers, etc.) at the locations 807

Store trained versions of the model(s) 810

In response to programmatic requests to analyze a target document, use the trained versions of the model(s) to determine contents of the target document (e.g., with associated confidence intervals) and provide the contents to one or more destinations; the granularity at which the content information is provided may differ – e.g., in some cases, based on client preferences, only the entity types whose instances are detected may be provided, while in other cases, character-level details may be provided 813

*FIG. 8*

ENTITY TYPE BASED LOCATION DETECTION FOR DOCUMENT CONTENT ANALYSIS

BACKGROUND

More and more applications are being implemented using network-accessible services, e.g., as part of a suite of services of a provider network or cloud computing environment. Such environments may for example provide virtualized computing services, storage services and the like. A number of analytics or machine-learning related services may be implemented in some provider network environments, and used for numerous types of tasks such as classification, demand prediction and so on.

The accurate extraction of information from document images (e.g., from scanned versions of documents such as expense receipts, contracts or agreements) is a requirement for many types of organizations. For example, a large business or government entity may have to extract information from thousands of scanned or photographed documents, often obtained using less-than-ideal image capturing devices. Furthermore, the granularity at which information regarding document details is required may vary, with some organizations requiring more detailed analysis than others. Some provider networks may offer a document analysis service for scalable automated extraction of document contents.

Traditionally, optical character recognition systems and services comprise at least two subsystems: one which is responsible for detecting the locations of words within document images, and one which is responsible for recognizing the words. For example, the location detection subsystem may provide indications of candidate bounding boxes containing words to the recognition subsystem. If the bounding boxes are not detected accurately enough by the location detection subsystem, the overall quality of the recognition of document contents may suffer, and may not be high enough to satisfy at least some users' requirements.

BRIEF DESCRIPTION OF DRAWINGS

FIG. 5 illustrates example entity types for which document analysis machine learning models may be trained, according to at least some embodiments.

FIG. 8 is a flow diagram illustrating aspects of operations that may be performed to implement document image content analysis, according to at least some embodiments.

Figure 1:
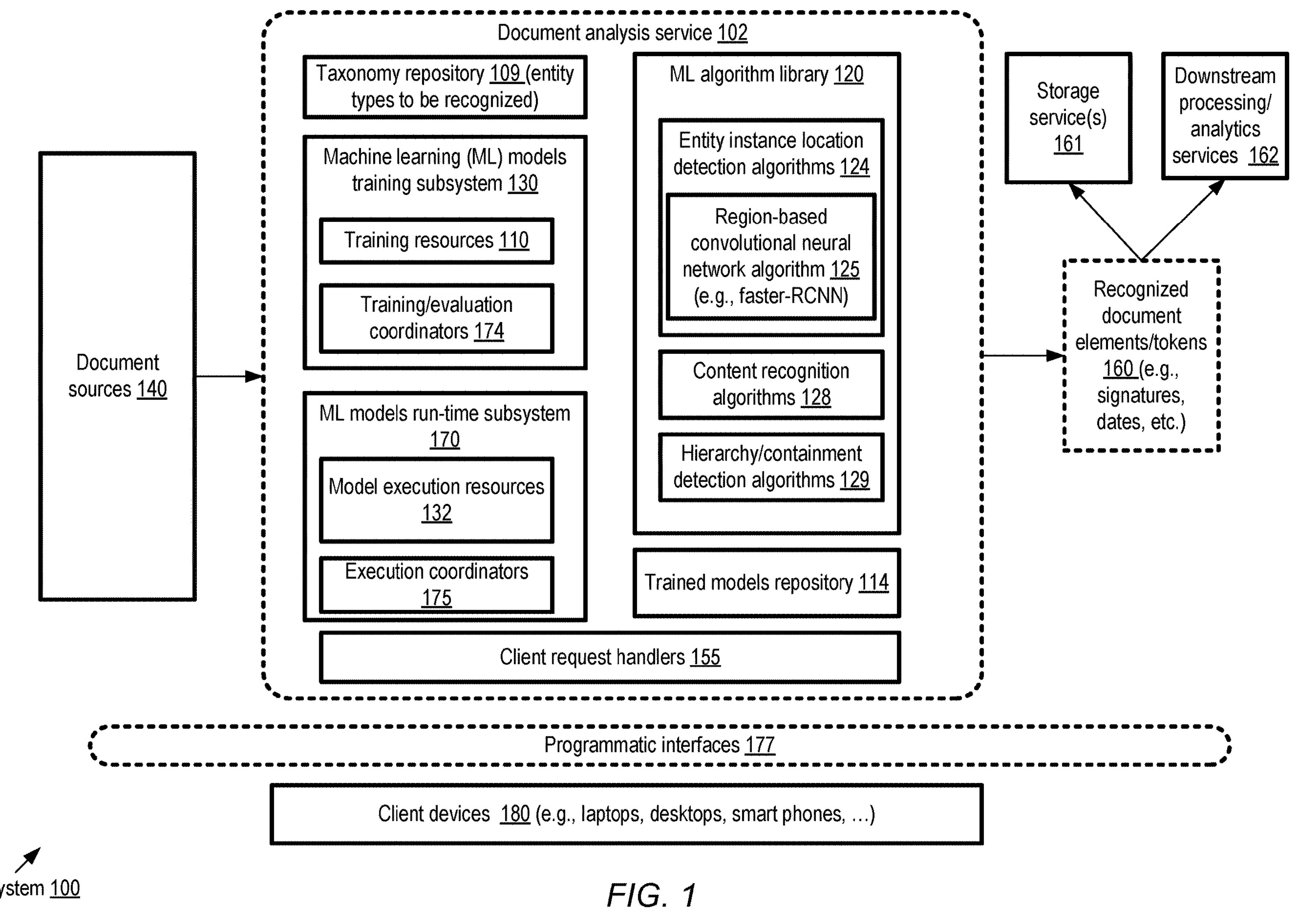
FIG. 1 illustrates an example system environment in which a document analysis service employing region-based convolutional networks for entity type based location detection may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for analyzing the content of document images (such as scanned representations of documents) using neural network-based machine learning models which are trained to detect locations of language tokens representing instances of various types of entities of interest, such as signatures and dates. Such models may be referred to as entity type-oriented neural network models. In at least some embodiments, a workflow for recognizing the contents (e.g., characters, numbers, words and the like) of document representations may comprise at least two stages or phases: a token location detection (also referred to as localization) phase, followed by a content recognition/identification phase. Each of the phases may utilize one or more machine learning models, such as neural network-based deep learning models, in at least some embodiments. At a high level, in the token location detection phase, approximate locations for various language tokens or token sequences corresponding to several different types of entities (e.g., signatures, dates etc.) within the document may be identified, without attempting to identify the tokens themselves or the lower-level contents (e.g., individual text or numeric characters) of the tokens. In the content recognition phase, the outputs of the token location detection phase (such as bounding boxes indicating candidate locations of instances of the entities of interest) may be consumed as input, and contents of the tokens may be recognized or identified. The problem of extracting semantic content accurately from document images is complicated by the fact that documents are typically much more densely packed with content than (for example) many photographs of landscapes, animals and the like, for which object recognition algorithms have been developed over the years. In order for the overall procedure of document content extraction to succeed, both phases mentioned above may have to work well; if the approximate locations of words are not detected accurately in the first phase, it would of course become even more difficult to detect the characters or the words.

In order to increase the accuracy of the location detection phase and the speed at which the locations are detected, so-called "faster" region-based convolutional neural networks (FRCNNs) may be employed in at least some embodiments. The use of the term "faster" to describe such neural networks is based on the evolution of a family of algorithm types; starting from a variant of convolutional neural network-based algorithms (CNNs) called region-based CNNs or RCNNs, progressively more efficient algorithms referred to as "fast" RCNNs and "faster" RCNNs have been developed. Faster RCNNs may include a number of different types of neural network layers in various embodiments: e.g., several convolutional layers whose output feature vectors are consumed by a region proposal network as well as region-of-interest pooling layers may be combined with one or more classification sub-networks or layers for each of several entity types. The faster-RCNN approach described herein may improve upon earlier techniques for location detection in that it generates not just candidate locations for tokens in general, but learns to detect candidate locations for instances of specific entity types—e.g., the respective locations of signatures, dates, postal address fields, and the like may be detected using entity-type-specific portions of the model. Intuitively, the FRCNN model for location detection may learn to detect and rely on the equivalent of visual cues within the document images—e.g., it may learn that signatures are (in at least some types of documents written in English or similar languages, in which words are arranged left-to-right within a line and the lines of a page are typically arranged top-to-bottom in the page) often present towards the bottom right of a document page, that dates are often located near signatures, and so on. Because the location detection model is able to detect candidate locations for instances of specific entity types, the content recognition stage of the analysis may also improve in accuracy in various embodiments—e.g., specialized sub-models for recognizing the contents of the respective entity types may be employed in some embodiments.

As one skilled in the art will appreciate in light of this disclosure, certain embodiments may be capable of achieving various advantages, including some or all of the following: (a) substantially improving the accuracy of the output generated by document analysis systems and services; (b) significantly increasing the speed with which document analysis models are able to generate document contents (including increases in model training speed as well as model execution speed), (c) enhancing the security of applications which rely on automatically verifying document contents, and/or (d) improving the user experience of clients that wish to customize document analysis models, e.g., by providing specifications of custom entity types whose instances are to be recognized.

According to at least some embodiments, a system may comprise one or more computing devices. The computing devices may include instructions that upon execution on or across one or more processors cause the computing devices to obtain an indication of a data set comprising one or more documents (e.g., in scanned or photographed form) which are to be used as input to train a set of machine learning models for recognizing or extracting the contents of the documents. In at least some embodiments, the computing devices may be part of a network-accessible document analysis service, and the data set may comprise scanned or photographed images of the documents. In one embodiment, the indication of the training data set may be provided by a client of the document analysis service using one or more programmatic interfaces implemented by the service, such as a web-based console, application programming interfaces (APIs), command line tools, graphical user interfaces and the like.

A set of entity types whose instances are to be detected within the documents may be determined, e.g., based on programmatic interactions with the client in some embodiments. The set of entity types may include at least some entity types, such as dates, signatures and the like, whose instances in turn comprise language tokens (such as words, numerals, punctuation symbols, and the like) in various embodiments. In some cases, a document analysis service may define a default set of entity types whose instances are to be detected, and a client may extend the default set by indicating custom instances via programmatic interfaces if desired.

One or more machine learning models may be trained using the data set in various embodiments. For example, a first machine learning model may be trained to detect, within an image of a particular document, candidate locations of instances of individual ones of the entity types without identifying individual tokens (e.g., words, characters, etc., depending on the document's content and language) within the instances. The first machine learning model, which may be referred to as a localization model in various embodiments, may comprise one or more region-based convolutional neural networks with at least a respective classifier layer for individual ones of the plurality of entity types in some embodiments. In at least some embodiments, the region-based convolutional neural network may comprise some number of convolution layers, region proposal network layers and region-of-interest pooling layers in addition to the classifier layers. In some embodiments, a second machine learning model, which may be referred to as a content recognition or identification may also be trained. The second machine learning model may learn to recognize or identify the language or pictorial tokens whose approximate candidate locations are detected by the first machine learning model in various embodiments; as such, the two models may work in a pipeline, with the output of the localization model being fed as input to the recognition model.

After the models have been trained, they may be stored, e.g., at a repository of a document analysis service. In response to programmatic requests for content recognition of various target documents, the trained versions of the models may be utilized to generate and provide details of the contents (e.g., the specific words, numeric values, tokens, etc. which make up entities such as dates, signatures and the like) of the target documents. In some cases, the extracted content details may be provided to a client of the document analysis service; in other cases, the extracted content details may be fed as input to one or more downstream analysis services (e.g., services which initiate actions based on the contents) and/or storage services (at which records indicating the extracted contents may be stored).

According to at least some embodiments, a client of a document analysis service may provide a programmatic indication of the kinds of entities for which the models are to be trained. For example, one client may be more interested in identifying/recognizing the contents of table cells (e.g., cells within spreadsheet-like tables) within documents, while another may be more interested in capturing email addresses. In various embodiments, the localization and/or recognition models may be trained to detect occurrences of instances of a wide variety of entity types, such as dates, signatures, handwritten words, URLs (Uniform Resource Locator) or URIs (Uniform Resource Identifier) type, emails, alphanumeric string type, single characters, postal addresses, postal codes, phone numbers, tables, table cells, images (embedded within the document image), equations, emojis, currency symbols and the like. Note that not all the entity types may comprise text or language tokens alone—e.g., some entity types such as images may comprise a collection of non-text pixels. In at least one embodiment, a client may use a programmatic interface to specify or define a custom entity type (e.g., using regular expressions or the like) of interest, and the models may be trained to detect and recognize contents of instances of such custom entities.

In at least one embodiment, the machine learning models employed for document analysis may also provide information about hierarchical or containment relationships—e.g., that a given target document consists of some number of paragraphs and a signature block, that each paragraph contains some number of sentences, and that the signature block contains a handwritten signature, a typed name of the signer and a date. In some embodiments, a third type of machine learning model, called a hierarchical relationship detection model, may be trained jointly with (or independently of) the localization and content recognition models to provide such hierarchical/containment information as output. In one embodiment, the models may be trained collectively to indicate the locations of various images embedded within documents, and/or to indicate objects (or language tokens) recognized within the embedded images. For example, with respect to a particular page of one target document, the document analysis service may be able to indicate (a) the specific words and sentences recognized in the page, (b) that the document contains an image of approximate size A×B pixels located at the top right, and (c) that the image shows a house with a house number N (part of the house's street address).

For some types of applications, it may be important to quickly detect the occurrences of instances of various entity types, and obtaining the details of the contents of the instances may not be as time-critical. For example, it may be important to quickly verify that all the fields of a table have been filled with the right type of data (e.g., text words in some fields, dates in others), and analysis of the details of the data may be deferred (if it is required at all). In some embodiments, the output of the localization model (which detects locations of instances of various entity types) may suffice for such applications—e.g., specific language tokens or characters may not have to be provided as output, and so the recognition models need not be run (at least immediately). In such a mode of operation, only candidate locations of instances of entity types, along with the particular entity type corresponding to each candidate location, may be provided to clients or users as a first step, and the more detailed recognition model output may be provided only if requested.

According to at least some embodiments, each of the machine learning models may provide a respective confidence level regarding its inferences. The overall confidence level associated with the content extracted from a document may computed at the document analysis service using the per-model confidence levels, and provided to clients or downstream applications in some such embodiments.

In at least one embodiment, multiple recognition models may be trained, e.g., one corresponding to each entity type of interest. The output generated at a localization model, which may indicate a candidate location of an instance of a particular entity type, may then be fed as input to the recognition model for that particular entity type. Such entity-type-specific recognition models may be considered respective sub-models of a general recognition model in some embodiments. In at least some embodiments, multiple localization models may be implemented as well, with each localization model trained to detect candidate locations of instances of a particular entity type.

The extent to which clients of a document analysis service can control different aspects of the models used on their behalf may vary in different embodiments. In some embodiments, clients who are more familiar with the details of deep neural network architectures may provide values for various hyper-parameters of the models (e.g., the number of layers of different types of neurons, the dimensionality of the feature vectors, and so on). In other embodiments, clients may leave such details to the document analysis service, and the hyper-parameter values may accordingly be selected at the service.

Example System Environment

FIG. 1 illustrates an example system environment in which a document analysis service employing region-based convolutional networks for entity type based location detection may be implemented, according to at least some embodiments. As shown, system 100 comprises resources and artifacts of a document analysis service 102 at which one or more types of machine learning models are employed to detect and recognize contents of documents. In the depicted embodiment, images (e.g., scans or photographs) of numerous documents may be obtained from one or document sources 140 and used to train the machine learning models at training subsystem 130. The trained models may be stored within one or more repositories 114, and executed at run-time subsystem 170 to produce recognized document elements or tokens 160 of various documents which were not included in the training data.

The document analysis service 102 may implement one or more programmatic interfaces 177 in the depicted embodiment, such as web-based consoles, application programming interfaces (APIs), command-line tools, graphical user interfaces and the like. The programmatic interfaces 177 may be utilized by clients of the document analysis service to submit various types of requests from client devices 180 (e.g., laptops, desktops, smart phones, other mobile computing devices and the like) and receive corresponding responses. Within the document analysis service 102, a set of client request handlers 155 may receive the programmatic requests submitted by clients, and send corresponding internal messages to other components of the service to perform the work requested.

A number of different types of machine learning algorithms of library 120 may be employed, singly or in combination, to analyze and extract content from documents in various embodiments. Such algorithms may be broadly categorized as entity instance location detection algorithms 124, content recognition algorithms 128, and hierarchy/containment detection algorithms 129 in the depicted embodiment. For each of the different algorithm categories, in some embodiments respective collections of one or more models may be trained at the training subsystem to perform corresponding respective sets of tasks. In at least some embodiments one or more of the algorithm types 124, 128 and 129 may utilize deep neural networks, although other types of model architectures and approaches may also or instead be used for one or more of the document analysis sub-tasks in other embodiments. The location detection algorithms 124 (also referred to as localization algorithms) may be used to detect the approximate locations of instances or examples of various entity types (such as signatures, dates, address fields, and so on) within document images, without actually identifying the lower-level contents (e.g., individual characters or symbols) within the instances. Models implementing the content recognition algorithms 128 may obtain representations of candidate locations of the instances from the entity instance location models, and identify the lower-level content elements within the candidate locations in various embodiments. In some embodiments, for example, in which individual images/scans of input documents or document pages are assumed to be rectangular in shape, the location detection models may indicate locations as bounding boxes specified using Cartesian coordinates, with the coordinate axes being aligned with edges of the document images/scans. For at least some of the bounding boxes, a corresponding entity type may be indicated by the location detection algorithm as well in at least one embodiment. Within the various bounding boxes indicated by the location detection model, the content recognition model(s) may attempt to identify language tokens which (taken together) make up an instance of an entity type (e.g., the entity type suggested by the location detection model). In at least one embodiment, logical relationships between entities detected within a document image, such as parent-child hierarchical relationships and/or sibling relationships, may also be learned with the help of hierarchy/containment detection algorithms 129, and information about such relationships may be included in metadata provided along with the recognized tokens/elements 160 of the document content. For example, such metadata regarding hierarchical entities could indicate that (a) a particular word or number was recognized within a table cell, (b) the table cell is part of a first table, (c) the first table is nested within a second table, and so on.

According to some embodiments, a client of the document analysis service 102 may use interfaces 177 to provide programmatic indications of (a) one or more data sets to be used for training document analysis models on the client's behalf and (b) the specific entity types whose instances are to be detected or identified within documents using the models. Any of a wide variety of entity types may be selected or indicated by a client in different embodiments, including but not limited to dates, signatures, representations of handwritten text, URLs (Uniform Resource Locator) or URIs (Uniform Resource Identifier) type, emails, alphanumeric string type, single characters, postal addresses, postal codes, phone numbers, tables, table cells, images (embedded within the document image), equations, emojis (also referred to as emoticons), currency symbols and the like. In some cases one or more entity types may comprise non-text content (for example, images embedded within a document may not necessarily contain recognizable text). In at least one embodiment, a client may define a custom entity type of interest (e.g., an entity type with begins with a specified combination of upper and lower-case letters), and models may be trained at the document analysis service 102 to detect and recognize contents of instances of such custom entities. Some entity type collections specified by clients may include hierarchical relationship information—e.g., entity types E1 and E2 may be indicated as being child entities of another entity E3, and so on. Different clients may be interested in the detection of respective combinations of entity types in some embodiments—that is, not all clients may wish to utilize models that are trained to detect the same set of entities. The collections of entities of interest to different clients may be referred to as taxonomies, and representations of the entity types may be stored within a repository 109 in the depicted embodiment. Note that in some embodiments, models may be trained for a default set of entity types for those clients who do not wish to specify any particular combination of entity types of interest.

The training subsystem 130 may comprise a set of training resources 110 (e.g., physical or virtual machines) which may be utilized to train models implementing the algorithms 124, 128 and/or 129 in the depicted embodiment. Training/evaluation coordinators 174 implemented at one or more computing devices may be configured to orchestrate the training process, e.g., by organizing training epochs, determining/tuning hyper-parameter values, and so on. In at least some embodiments, the location detection models trained at subsystem 130 may include models comprising one or more region-based convolutional neural networks (RCNNs) 125 (such as faster-RCNN models). An RCNN may comprise one or more classifier layers or sub-networks in some embodiments, e.g., a respective layer for individual ones of the entity types of interest may be configured, in addition to convolution layers, region proposal network layers, and region-of-interest polling layers. The output generated by the location detection models may indicate not just candidate locations of instances of various entities, but also the type of entity corresponding to, or expected to be found within, at least some of the candidate locations in at least some embodiments; as such, the location detection models may be described as performing entity type based or entity type aware location detection. Recognition models, which consume the candidate locations produced as output by the R-CNN location detection models, and detect/identify the details of the contents in each candidate location, may also be trained at the subsystem 130 in various embodiments. In some embodiments, hierarchy or containment relation detection models implementing algorithms 129 may also be trained, e.g., jointly with the location detection and/or recognition models.

After the training is complete, the trained versions of the location detection models, the content recognition models, and/or the hierarchical relationship models may be stored in repository 114 of the document analysis service. The trained versions of the models may be executed (e.g., by execution coordinators 175 using model execution resources 132 of the run-time subsystem 170) to identify language tokens or other elements 160 of the content of target documents submitted via programmatic interfaces 177 in various embodiments. In at least some embodiments, the recognized elements may be stored within one or more storage services 161 and/or transmitted for further analysis at downstream processing/analytics services 162. For example, if a document was expected to contain a signature, and the recognized elements 160 corresponding to that document do not include a signature, a corrective action may be initiated at such a downstream analytics service—e.g., the submitter of the document may be notified regarding the missing signature.

Example Region-Based Convolutional Neural Network Model

Figure 2:
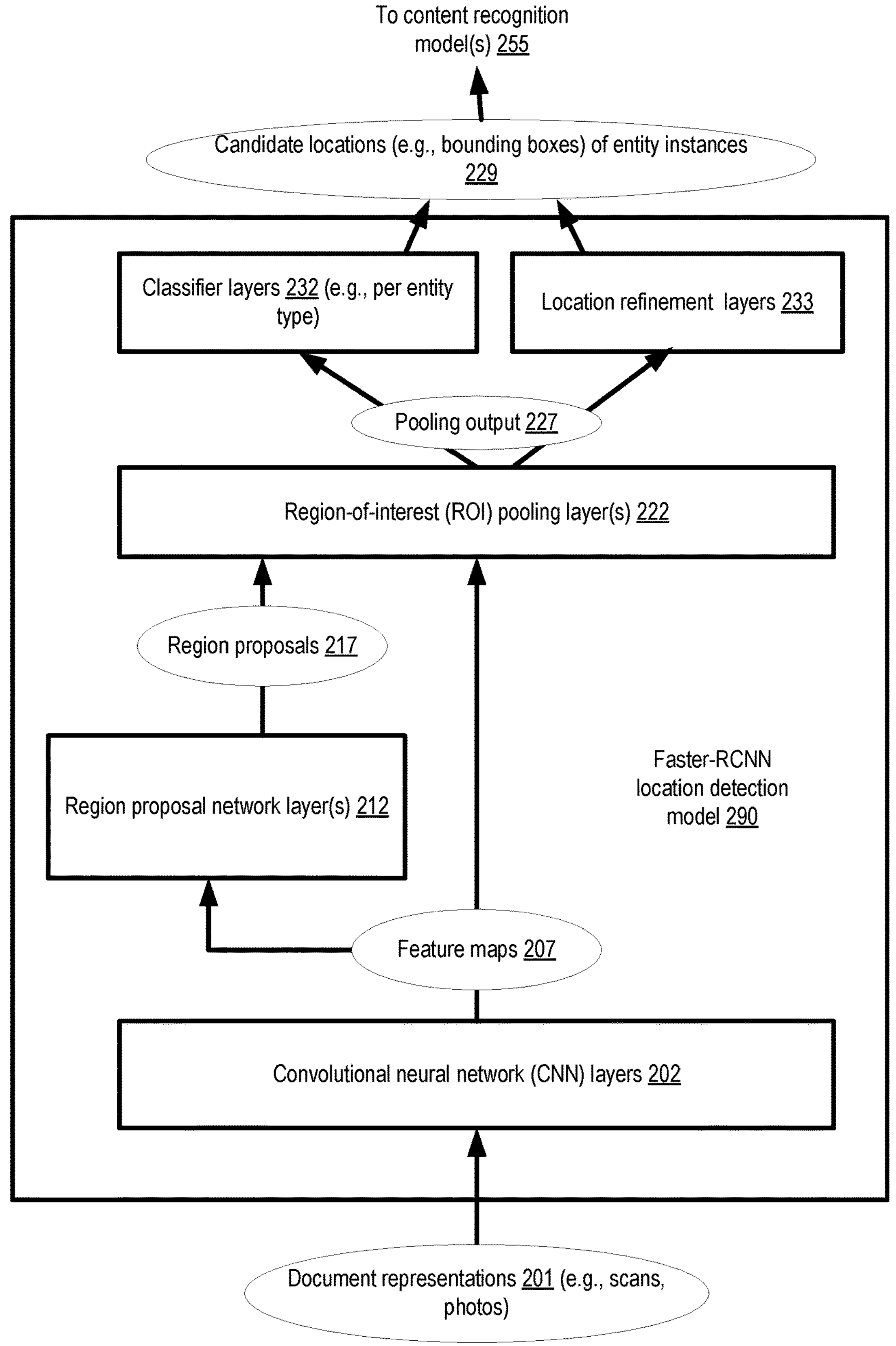
FIG. 2 illustrates an example architecture of a region-based convolutional neural network which may be employed for detecting the locations of entities within document images, according to at least some embodiments.

FIG. 2 illustrates an example architecture of a region-based convolutional neural network which may be employed for detecting the locations of entities within document images, according to at least some embodiments. In the depicted embodiment, a deep neural network model comprising several different types of subnetworks or layers may be employed for entity type based location detection tasks of the kind discussed above. The arrangement of neural network subcomponents shown may be referred to (for historical reasons having to do with the evolution of neural network model architectures, and the architecture-dependent increases in performance achieved using the different types of models) as a faster region based convolutional neural network or faster-RCNN model 290.

Faster-RCNN model 290 may comprise a number of convolutional neural network (CNN) layers 902, one or more region proposal network (RPN) layers 212, one or more region-of-interest (ROI) pooling layers 222, one or more classifier layers 232 and/or one or more location refinement layers 233 in the depicted embodiment. The input of the faster-RCNN model may comprise document representations 201 (e.g., scans or photographs of documents or pages of documents), while the output may comprise candidate locations 229 (e.g., bounding boxes) of instances of various entity types within the document representations.

The input document representations may initially be processed at the CNN layers 202, where a set of feature maps (internal vector representations of the input) may be generated and provided to the RPN layers 212 as well as the ROI pooling layers 222. As suggested by their names, the RPN layers may generate region proposals 217, indicating sub-portions of the input which may contain language tokens and/or other types of content. The speed with which region proposals can be generated using RPN layers may be significantly faster than if some more conventional techniques such as selective search were used. The ROI pooling layers 222 may consume the original feature maps as well as the region proposals (which may indicate regions of different sizes) in the depicted embodiment, and implement a technique called max pooling to generate region maps of a fixed size, which may then be provided as input to one or more classifier layers 232 (e.g., a respective classifier for the various entity types whose instances are to be located) as well as one or more location refinement layers 233. As indicated by the use of the term "refinement", the input of the location refinement layers 233 may include approximate information about regions or bounding boxes containing entity instances, and the output of layers 233 may include more precise or refined information about the locations of the regions. The output of the classifier layers and the location refinement layers may comprise the candidate locations 229, which may be provided as input to content recognition models 255 in at least some embodiments.

In at least some embodiments, a client of a document analysis service which uses a faster-RCNN of the kind shown in FIG. 2 may provide preferred values of various hyper-parameters, such as training and testing related thresholds, the sizes of the rectangles to be considered with regard to region proposals, the number of samples per input image to be used during training, pooling resolutions, the maximum number of training iterations, weight decay factors, learning rates, and so on.

In some embodiments, the content recognition models 255 (and/or hierarchical relationship detection models) may also comprise respective sets of one or more deep neural networks. Hyper-parameter values may also be indicated programmatically by clients for the content recognition models and/or the hierarchical relationship detection models in at least one embodiment. In one embodiment, other types of machine learning models (e.g., different neural networks and/or models which do not utilize neural networks) may be used for location detection, content recognition and/or hierarchical relationship detection.

Example Document Content Analysis Techniques

Figure 3:
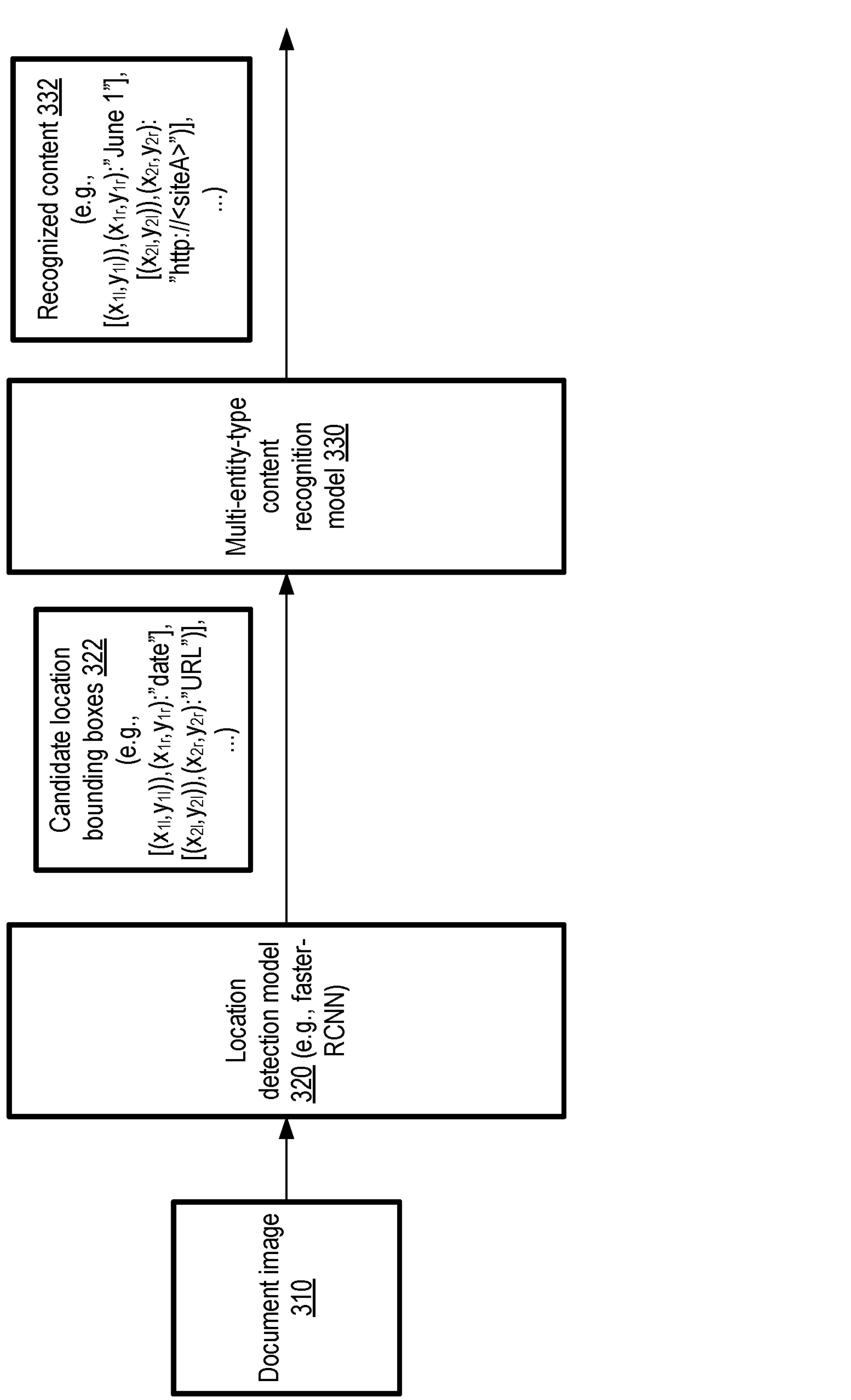
FIG. 3 and FIG. 4 respectively illustrate overviews of a pair of alternative document content analysis techniques, according to at least some embodiments.
Figure 4:
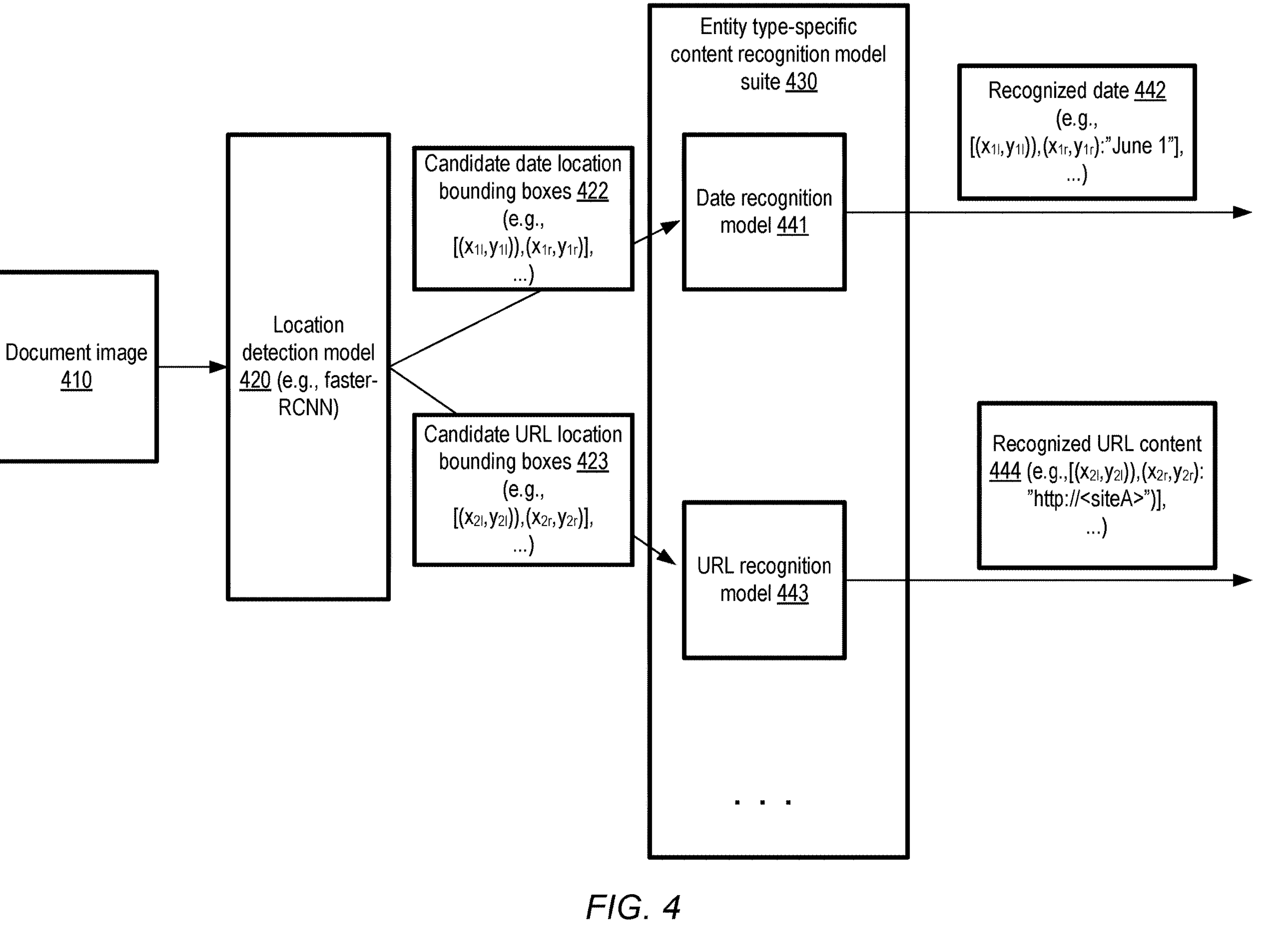

FIG. 3 and FIG. 4 respectively illustrate overviews of a pair of alternative document content analysis techniques, according to at least some embodiments. The techniques differ from one another primarily with respect to the organization of the content recognition portions of the system.

In the embodiment depicted in FIG. 3, a single content recognition model referred to as a multi-entity-type content recognition model 330, may be utilized in combination with a location detection model 320 such as a faster-RCNN model similar to that discussed above. Document images 310 may be supplied as input to the location detection model 320. The location detection model 320 may generate one or more candidate location bounding boxes 322, each specifying a rectangular region using x, y coordinates, as well as a candidate entity type in the depicted embodiment. For example, one bounding box whose bottom left coordinates are ($x_{1l}$, $y_{1l}$), top right coordinates are ($x_{1r}$, $y_{1r}$), and proposed entity type is "date" may be generated, while another bounding box whose bottom left coordinates are ($x_{2l}$, $y_{2l}$), top right coordinates are ($x_{2r}$, $y_{2r}$), and proposed entity type is "URL" may be generated, and so on. The ranges of the x and y values for the coordinates, as well as the origins of the coordinate system, may be dependent on the number of pixels in the input images in at least some embodiments.

The multi-entity-type content recognition model 330 may detect whether the candidate location bounding boxes 322 actually contain instances of the corresponding entity types, and if so, identify or recognize the actual content of the bounding boxes in at least some embodiments. For example, with respect to the bounding box with coordinates [($x_{1l}$, $y_{1l}$), ($x_{1r}$, $y_{1r}$)], the content "June 1" (which is a date as proposed by the location detection model) may be recognized, and with respect to the bounding box with coordinates [($x_{2l}$, $y_{2l}$), ($x_{2r}$, $y_{2r}$)], the content "http://<siteA>" (which is a URL) may be recognized in the scenario shown in FIG. 3.

In the embodiment depicted in FIG. 4, a different approach may be used, with a suite of entity type-specific content recognition models being employed in combination with a single location detection model 420, which may similar in functionality to model 320 of FIG. 3. As shown, such a suite 430 may include a date recognition model 441 (for recognizing instances of the "date" entity type), a URL recognition model 443, and so on. Document images 410 may be supplied as input to the location detection model 420. The location detection model 420 may generate one or more candidate location bounding boxes such as 422 and 423, each specifying a rectangular region using x, y coordinates, as well as a candidate entity type in the depicted embodiment. As in the scenario depicted in FIG. 3, one bounding box whose bottom left coordinates are ($x_{1l}$, $y_{1l}$), top right coordinates are ($x_{1r}$, $y_{1r}$), and proposed entity type is "date" may be generated, while another bounding box whose bottom left coordinates are ($x_{2l}$, $y_{2l}$), top right coordinates are ($x_{2r}$, $y_{2r}$), and proposed entity type is "URL" may be generated.

In contrast to the scenario depicted on FIG. 3, however, the candidate location bounding boxes may not all be transmitted to the same destination; instead, they may be routed to respective models of suite 430 based on the proposed entity type. Thus, a date location bounding boxes 422 may be sent to the date recognition model 442, a URL location bounding box 423 may be sent to URL recognition model 423, and so on. In some embodiments, output of individual ones of the classification sub-models or layers of the location detection model 420 may be directed to a corresponding entity type specific recognition model. The outputs 442 and 444 of the content recognition models may indicate the specific language tokens (e.g., the string "June 1" in the case of the date, etc.) as in the scenario depicted in FIG. 3.

The approaches shown in FIG. 3 and FIG. 4 may differ with respect to such properties as overall training times, overall accuracy of the detected content, and so on. In some embodiments, for example, it may be the case that higher overall content recognition quality or accuracy may be achieved using the approach shown in FIG. 4 than is achieved using the approach shown in FIG. 3, at a cost of somewhat slower training times.

According to at least one embodiment, a suite of location detection models, e.g., one for each entity type of interest (or one per sub-group of entity types), may be used instead of using a single location detection model as indicated in FIG. 3 and FIG. 4. In some embodiments, a hierarchical relationship detection model may be trained jointly with (or independently of) the location detection model(s) and/or the recognition model(s). Such a hierarchical relationship detection model may consume the outputs of the location detection models as well as the recognition models in one implementation.

Example Entity Types

Figure 5:
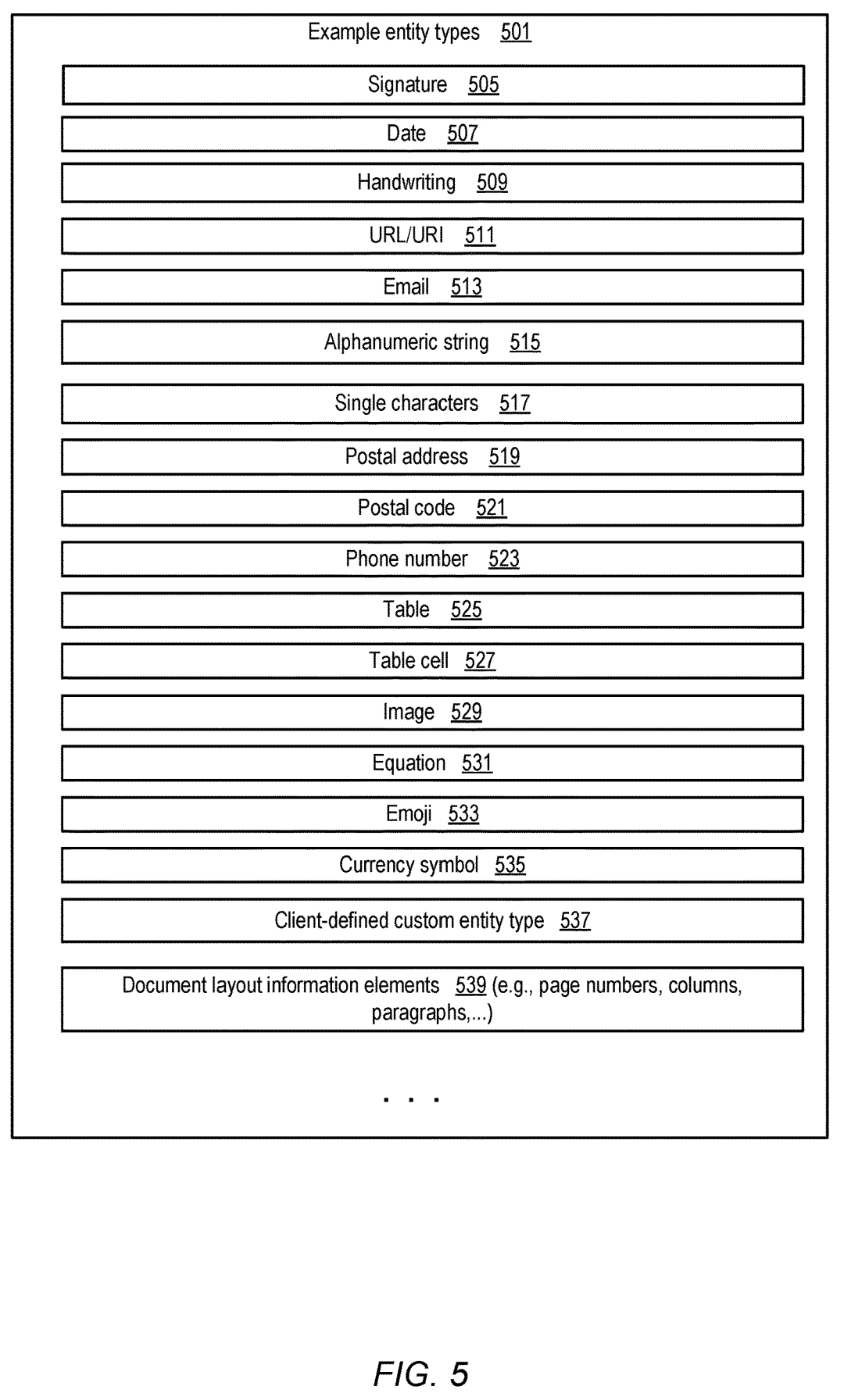

FIG. 5 illustrates example entity types for which document analysis machine learning models may be trained, according to at least some embodiments. In some embodiments, a document analysis service similar in features and functionality to service 102 shown in FIG. 1 may be designed to extract content corresponding to a plurality of entity types from document images, and instances of at least some of the entity types may comprise combinations of language tokens such as characters or words arranged in a particular sequence or pattern. In some cases the document analysis service may be able to extract information about images (which do not necessarily comprise language tokens) or tables embedded within a document, including for example the specific objects represented in the images, and/or the entity types whose instances are contained within table cells or sub-tables.

In the embodiment depicted in FIG. 5, the example entity types for which location detection and content recognition is supported may include signatures 505 (e.g., handwritten and/or electronic signatures in various formats). Dates 507 expressed in various formats (such as MM-DD-YYYY format where MM refers to months expressed in two decimal digits, DD represents dates within months, and YYYY represents a 4-digit year, YYYY-MM-DD etc.) may represent another important entity type recognized by the service. In some embodiments, the models of a document analysis service may be trained to detect dates expressed according to any of various calendars (e.g., calendars used in different countries or regions of the world), and may not necessarily be restricted to any single calendar. Some clients may wish to recognize other elements of handwriting 509 (i.e., handwritten notes, etc., which may differ from signatures) within input documents with the help of the service, and the models may be trained accordingly.

URLs or URIs 511 may represent another type of entity of interest in the depicted embodiment. Emails 513 (e.g., entire emails including headers and email signatures if any) may be detected by document analysis services in some embodiments. In one embodiment a client may specify that particular alphanumeric strings 515 (e.g., company names, country names or the like) and/or particular single characters 517 are to be considered as entity types by the service. In other embodiments, generic alphanumeric strings and/or individual characters which do not fit into any of the other specific entity types may be treated as respective entity types at a document analysis service.

Several types of contact-related information, such as postal addresses 519, postal codes 521, phone numbers 523 and the like may be included in the entity types for which document analysis models are trained in some embodiments. Tables 525 (e.g., structures comprising rows and columns of cells), table cells 527 and the like may be recognized as instances of respective entity types in one embodiment. Images 529 (incorporated within the images of the documents), equations 531 (such scientific or mathematical equations), emojis 533 (small icons often used in text messages) and/or currency symbols 535 may be treated as respective entity types whose instances are recognized within documents in some embodiments.

Clients of a document analysis service may indicate the particular entity types of most interest to them, or even define new or custom entity types (537) of interest in at least one embodiment. Several approaches may be used to define custom entity types in different embodiments. For example, in some embodiments clients may provide entity type definitions via programmatic interfaces using the equivalent of regular expressions; in other embodiments, clients may programmatically specify a collection of example instances from which the document analysis service may learn patterns which can be used to detect and recognize instances of the entity types. In at least some embodiments, clients may specify hierarchical combinations of entity types which are to be detected and recognized—e.g., some clients may wish to detect tables which contain embedded images, or embedded images which in turn comprise language tokens. In at least one embodiment, the entity types 501 for which location detection and/or content recognition is supported may include document layout information elements 539, such as page numbers, paragraphs, text columns within a page, list bullet points, etc. In one embodiment, the document analysis service may comprise models trained to detect instances of entity types other than those shown in FIG. 5.

Example Programmatic Interactions

Figure 6:
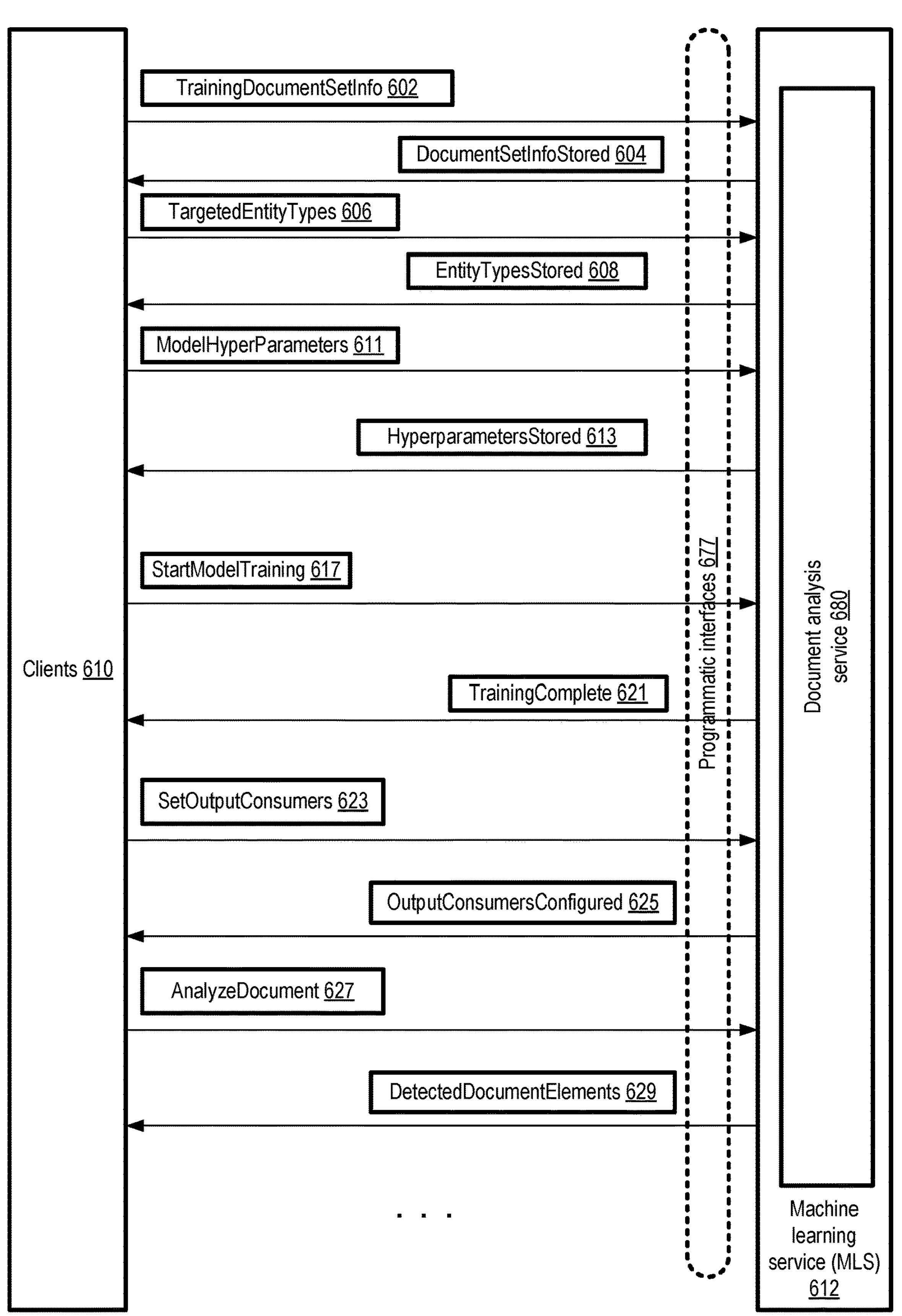
FIG. 6 illustrates example programmatic interactions related to the training and use of machine learning models for document analysis, according to at least some embodiments.

FIG. 6 illustrates example programmatic interactions related to the training and use of machine learning models for document analysis, according to at least some embodiments. A document analysis service 680, similar in features and functionality to service 102, may be implemented as a subcomponent of a more general machine learning service 612 in the depicted embodiment. One or more programmatic interfaces 677 may be implemented by the document analysis service 680, such as web-based consoles, command-line tools, APIs, graphical user interfaces and the like. In some embodiments, one or more of the programmatic interfaces of the document analysis service 680 may be incorporated within tools or programs such as scanners or mobile device cameras, so that pictures or scans of documents which are generated using such tools can be automatically submitted to the document analysis service if desired.

A client 610 of the document analysis service may submit information about a data set of documents to be used for training one or more models, e.g., via a TrainingDocumentSetInfo message 602 in the depicted embodiment. The submitted information may indicate, for example, a storage device or a database where images of the documents may be obtained, as well as credentials or permission information enabling the retrieval of the documents. The information about the data set may be stored at the service, and a DocumentSetInfoStored message 604 may be sent to the client in some embodiments.

In some embodiments, as mentioned earlier, clients may submit information indicating entity types of interest in a TargetedEntityTypes message 606 sent to the document analysis service 680. The service may store metadata indicating the particular entity types of interest to the client, and send an EntityTypesStored message 608 back to the client. In some embodiments, a TargetedEntityTypes message 606 may include one or more definitions or specifications of custom entity types of the kind discussed above (e.g., using regular expressions etc.). Note that in at least some embodiments, if a client does not indicate a specific set of entity types of interest, the service 680 may train one or more models to detect locations of, and recognize content of, instances of a default set of entity types.

Before requesting that location detection, content recognition and/or hierarchical relationship detection models be trained on their behalf, in some embodiments clients 610 may submit values of various hyper-parameters to be used for the models. Such hyper-parameters may include, for example, training and testing completion criteria, a target number of training iterations, learning rates, the dimensionality of various neural network layers, sizes of regions to be considered, pool sizes (with respect to pooling layers), the specific algorithms to be used for the different models (such as the faster-RCNN algorithm described earlier), whether multi-entity-type recognition models are to be trained (as in FIG. 3) or entity-type specific models are to be trained (as in FIG. 4) and so on. The service 680 may send back a HyperparametersStored message 613 in response in the depicted embodiment.

A StartModelTraining request 617 may be submitted to initiate the training of the set of models to be used collectively to detect instance locations and recognize instance contents in the depicted embodiment. When training completion criteria (which may have been indicated by the client as hyper-parameters, or selected at the service 680 if not specified by the client) are met, the trained versions of the models (e.g., a location detection model and at least one content recognition model) may be stored, and a TrainingComplete message 621 may be sent to the client indicating that the models are available for execution.

In some embodiments, a client may submit a SetOutputConsumers request 623 to indicate the set of downstream services to which the output produced by the trained models is to be directed, e.g., for further processing of the contents of the documents, for storing the content elements detected in the documents, for constructing search indices on the elements, and so on. In response, the document analysis service 680 may store information regarding the consumers to which the content elements detected are to be sent on behalf of the client, and send an OutputConsumersConfigured messages 625 to the client.

If and when a client wishes to utilize the trained models to identify the contents of a document, an AnalyzeDocument request 627 may be sent to the service 680. The submitted document may be provided to the trained versions of the models as input, and the set of elements detected within the document may be sent back to the client (e.g., in a DetectedDocumentElements message 629) and/or to the output consumers indicated by the client. In some embodiments, the document analysis service may support other types of programmatic interactions that those shown by way of example in FIG. 6.

Example Provider Network

Figure 7:
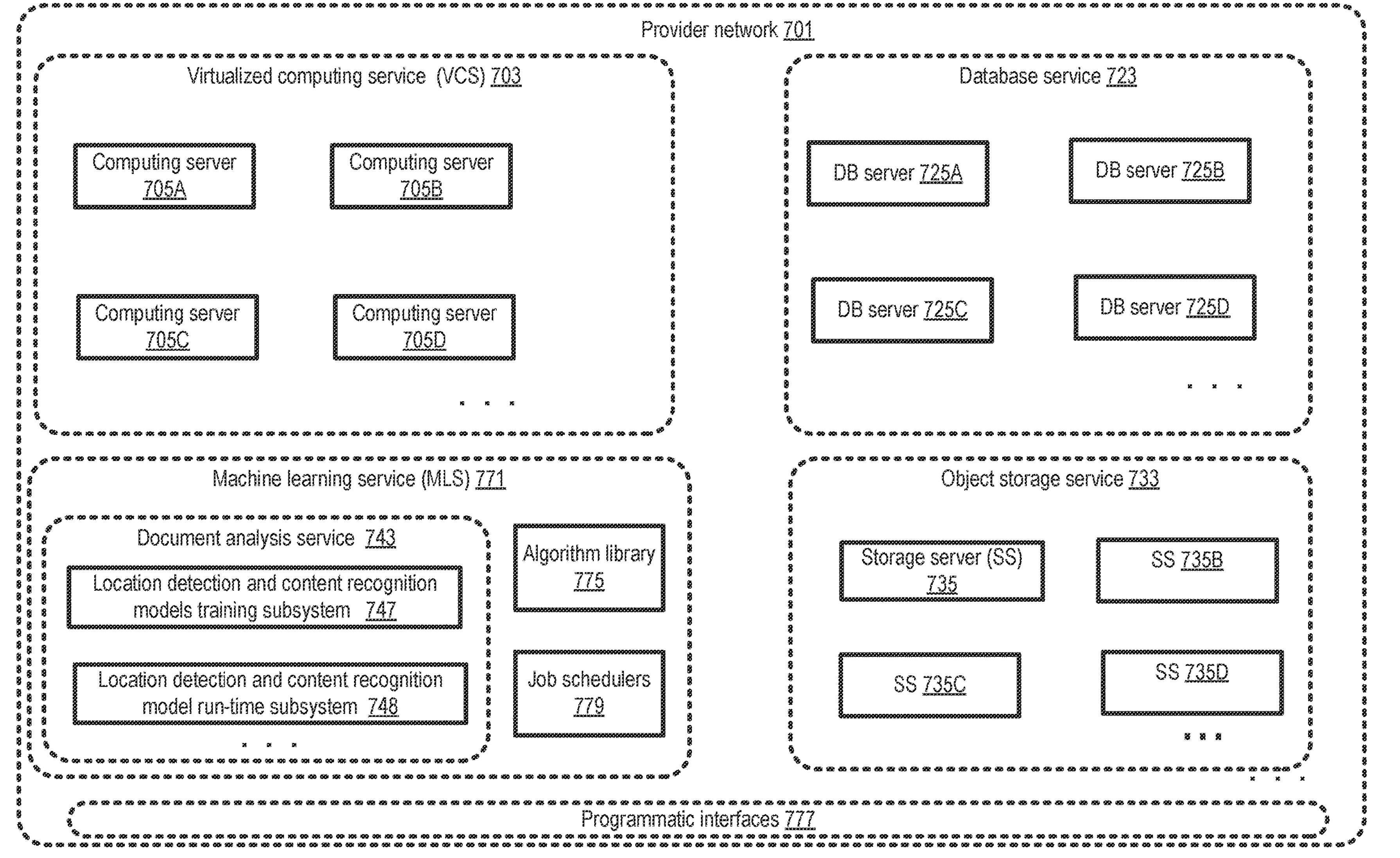
FIG. 7 illustrates an example provider network environment, according to at least some embodiments.

In at least some embodiments, a document analysis service at which entity type based location detection of the kind discussed herein is performed may be one of a suite of services of a provider network. FIG. 7 illustrates an example provider network environment, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries. For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network).

In the embodiment depicted in FIG. 7, provider network 701 includes a virtualized computing service 703, and a database service 723, and an object storage service 733 as well as a machine learning service 771 comprising a document analysis service 743 (similar in features and functionality to service 102 of FIG. 1). The document analysis service 743 may include a training subsystem 747 as well as a run-time subsystem 748. The machine learning service 771 may include an algorithm library 775 (which includes code and artifacts for algorithms similar to the faster-RCNN algorithm discusses earlier, as well as other neural network based models used for content recognition, hierarchical relationship detection and the like) as well as one or more job schedulers 779 responsible for orchestrating long running machine learning tasks in the depicted embodiment.

Each of the services of provider network 701 may include a respective set of computing devices and/or other resources in some embodiments. Components of a given service may utilize components of other services in the depicted embodiment—e.g., compute instances (CIs) (such as guest virtual machines) set up at the computing servers 705 (e.g., 705A-705D) of the virtualized computing service 703, database (DB) servers 725 (e.g., 725A-725D) and/or storage servers 735 (e.g., 735A-735D) of an object storage service 733 may be employed by various other services of provider network 701 (including the document analysis service 743) to implement their respective functions. Individual ones of the services shown in FIG. 7 may implement a respective set of programmatic interfaces 777 which can be used by external and/or internal clients (where the internal clients may comprise components of other services) in the depicted embodiment. Individual ones of the services shown in FIG. 7 may each provide high levels of automated scalability, availability, data durability, and failure resilience, enabling varying levels of workloads to be handled gracefully.

AMRS 823 may interact with or utilize other services of the provider network 801 in several different ways in the depicted embodiment. First, at least some components of the AMRS may utilize components of other services—e.g., computations for detecting access patterns, analyzing applications to identify target data structures and/or to identify sources of access requests and the like may comprise one or more compute instances 809, metadata and/or access records (including context information) may be stored at database servers 845 or storage servers 835, and so on. Secondly, the AMRS may monitor memory accesses of applications being run at other services, e.g., at the virtualized computing service 803, at the execution resource pool 855 of the server-less dynamically provisioned computing service, at the model training resources 875 or the model execution resources 876 of the machine learning service, and so on. Some of the applications whose data structures are to be monitored may be developed at the software development and deployment service 813, e.g., using development and testing pipelines managed using resources 815, and the AMRS may analyze versions of the applications at service 813 to detect target data structures and/or access request sources. In at least one embodiment, at least some of the techniques discussed above for efficiently monitoring and reporting on memory accesses may be implemented without acquiring resources of network-accessible services such as those shown in FIG. 8. For example, a standalone set of computing devices which are not part of a network-accessible service may be used in some embodiments.

Methods for Document Analysis

FIG. 8 is a flow diagram illustrating aspects of operations that may be performed to implement document image content analysis, according to at least some embodiments. As shown in element 801, an indication of a source data set comprising representations (e.g., scanned images) of a plurality of documents which may be used to train machine learning models to detect document content may be obtained, e.g., via one or more programmatic interfaces of a document analysis service of a provider network, similar in features and functionality to service 102 of FIG. 1. Programmatic interfaces implemented by such a service may include web-based consoles, application programming interfaces (APIs), command-line tools, graphical user interfaces and the like in various embodiments.

A collection of one or more entity types whose instances are to be detected within documents using machine learning models may be determined in various embodiments (element 804). In some cases, a document analysis service may have access to a default list of entity types, such as signatures, dates, URLs, and the like, and the default list may be used. In at least some embodiments, a client of the document analysis service may use the programmatic interfaces implemented by the service specify the particular entity types of most interest to that client. In one embodiment, a client may define one or more special or custom entity types, e.g., comprising alphanumeric strings that are of extra importance based on the client's document processing applications, and the definitions of such custom types may be sent to the document analysis service via programmatic interfaces along with the names of the custom entity types.

One or more types of document analysis models may be trained in various embodiments (element 807), e.g., using the source data set and the collection of entity types. Such models may include one or more location detection models and one or more content recognition models in the depicted embodiment. A location detection model may be trained to detect candidate locations of instances of various entity types of interest within documents, without actually identifying and/or parsing the specific characters or other tokens at the candidate locations. In at least some embodiments, a location detection model may comprise one or more region-based convolutional neural networks such as a faster region-based convolutional neural network, which in turn may include or utilize one or more convolutional neural network layers, region proposal network layers, region-of-interest pooling layers, and/or one or more classifier sub-networks or layers corresponding to respective entity types. In some embodiments, the relationship between the classifiers and the entity types may not necessarily be 1:1—that is, a given classifier may be trained for one or more entity types. A given content recognition model may also include one or more deep neural networks in some embodiments. The content recognition model(s) may consume candidate locations identified by the location detection models (represented as bounding boxes in some implementations), as well as indications of the particular entity types for which the locations were detected, and produce output indicating recognized language tokens or other content elements (e.g., characters, words, numbers etc.) of the entity instances found at those candidate locations in various embodiments. In some embodiments, one or more additional models that learn to detect hierarchical or containment relationships among entity instances may also be trained, e.g., jointly with the location detection and content recognition models. In some embodiments, entity-type-specific content recognition models may be trained—e.g., one recognition model may be trained for signatures, one for dates, and so on. In one embodiment, entity-type-specific location detection models may be trained.

Trained versions of the model(s) may be stored (element 810), e.g., at a repository of the document analysis service in various embodiments. In response to a programmatic request to analyze a target document, the trained versions of the models may be employed to determine contents of the target document (element 813), and the contents may be provided to one or more destinations (e.g., to the client on whose behalf the target document is analyzed, to downstream services or applications for post-processing, to a database or storage service at which records of the recognized content elements may be stored, and so on). In some embodiments, confidence intervals associated with the detected content elements may be provided as well—e.g., a document analysis service may indicate that the confidence level associated with a detected date is 99%, the confidence level associated with a detected signature is 97%, and so on. In at least one embodiment, each of the trained machine learning models may generate its own confidence level information, and the overall confidence level associated with individual content elements may be determined at the document analysis service by aggregating or combining the model-level confidence levels. In some embodiments, the content information for a target document may be provided at client-specified granularities—e.g., a client may indicate that only the names of the entity types whose candidate instance locations were identified are needed for one or more target documents, rather than the details of the characters, words or numbers at those locations. In such a scenario, content recognition models may not be required, as the output generated by the location detection model(s) may suffice for the level of information of interest to the client. In other cases, or by default in at least one embodiment, the full details of the content (e.g., including characters, words, numbers, hierarchical relationship information, etc.) may be provided.

It is noted that in various embodiments, some of the operations shown in FIG. 8 may be implemented in a different order than that shown in the figure, or may be performed in parallel rather than sequentially. Additionally, some of the operations shown in FIG. 8 may not be required in one or more implementations.

Use Cases

The techniques described above, of utilizing region-based convolutional neural network models to detect locations of instances of entity types within documents, may be useful in a variety of scenarios. The digital extraction of data and information from document images is a difficult task with a strong business need, e.g., for verification of signatures associated with contracts, cost containment efforts with respect to submitted expenses, financial fraud detection, and so on. By increasing the accuracy and speed with which the contents of documents can be detected and recognized, numerous types of business and/or government-related transactions may be made more efficient and less error-prone.

Illustrative Computer System

Figure 9:
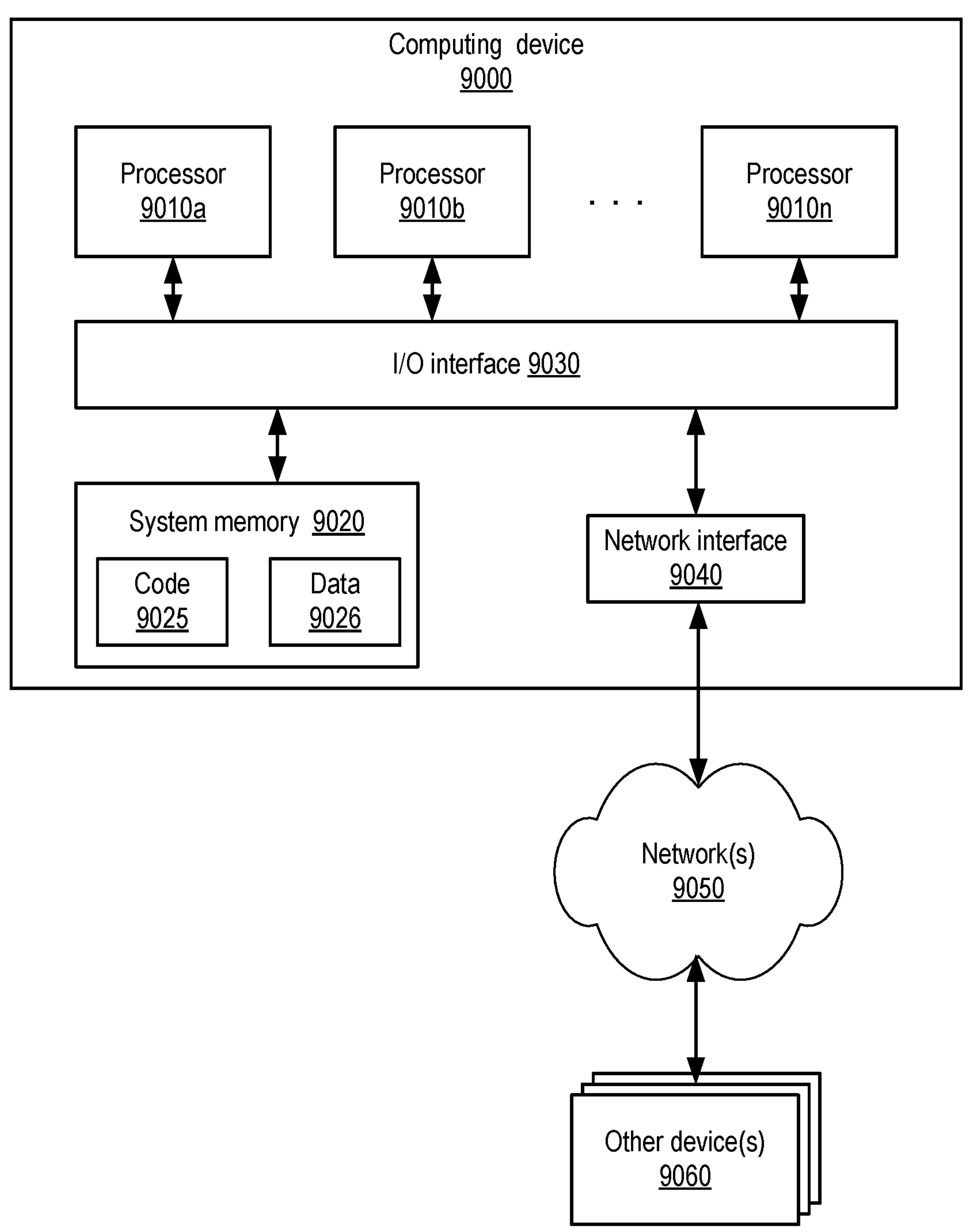
FIG. 9 is a block diagram illustrating an example computing device that may be used in at least some embodiments.

In at least some embodiments, a server that implements one or more of the techniques described herein, including for example components of a document analysis service, a machine learning service and the like may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices include instructions that upon execution on or across one or more processors cause the one or more computing devices to:

obtain a data set comprising one or more documents;

determine a plurality of entity types whose instances are to be detected within the one or more documents, wherein the plurality of entity types comprises at least some entity types whose instances comprise language tokens, including a date type and a signature type;

train a first machine learning model using the data set to detect, within an image of a particular document, candidate locations of instances of individual ones of the plurality of entity types, including the at least some entity types whose instances comprise language tokens, wherein:

the first machine learning model is trained to output the candidate locations and entity types for the instances, the output does not identify content of individual language tokens within the instances, the first machine learning model comprises one or more convolutional neural network layers, one or more region proposal network layers, one or more location refinement layers, one or more region-of-interest pooling layers and a plurality of classifier layers, the one or more region-of-interest pooling layers perform pooling using the image to generate region maps, respective ones of the plurality of classifier layers correspond to respective ones of the plurality of entity types, including the at least some entity types, the plurality of classifier layers determines the entity types for the instances using the region maps, and the one or more location refinement layers refine region maps associated with the entity types to determine the candidate locations;

train at least a second machine learning model to recognize one or more language tokens at individual ones of the candidate locations identified by the first machine learning model;

train a third machine learning model to provide hierarchical relationship information indicating parent-child relationships between the instances of the individual ones of the plurality of entity types identified by the first machine learning model using the refined region maps associated with the entity types and one or more language tokens identified by the second machine learning model at the refined region maps;

store respective trained versions of the first, second, and third machine learning models; and in response to a programmatic request indicating a target document, provide, using one or more of the respective trained versions, an indication of contents of the target document and the hierarchical relationship information between the instances of the individual ones of the plurality of entity types, wherein the contents include at least one instance of a particular entity type of the plurality of entity types, and wherein the hierarchical relationship information between the instances of the individual ones of the plurality of entity types are determined based on the one or more language tokens for the contents and region maps associated with the individual ones of the plurality of entity types.

2. The system as recited in claim 1, wherein the one or more computing devices include further instructions that upon execution on or across the one or more processors further cause the one or more computing devices to:

obtain, via a programmatic interface, an indication of at least one entity type of the plurality of entity types prior to the training of the first machine learning model.

3. The system as recited in claim 1, wherein the indication of the contents of the target document comprises an indication of a containment relationship between a first instance of a first entity type and a second instance of a second entity type.

4. The system as recited in claim 1, wherein the plurality of entity types includes a custom entity type defined by a client of a document analysis service, and wherein the one or more computing devices include further instructions that upon execution on or across the one or more processors further cause the one or more computing devices to:

obtain, via one or more programmatic interfaces, a definition of the custom entity type.

5. The system as recited in claim 1, wherein the one or more computing devices include further instructions that upon execution on or across the one or more processors further cause the one or more computing devices to:

obtain, via one or more programmatic interfaces, an indication of one or more hyper-parameters of at least the first machine learning model.

6. A method, comprising:

performing, at one or more computing devices:

determining a plurality of entity types whose instances are to be detected within a representation of a document, wherein the plurality of entity types comprises at least some entity types whose instances comprise language tokens;

training a first machine learning model to detect, within the representation of the document, candidate locations of instances of individual ones of the plurality of entity types, including the at least some entity types whose instances comprise the language tokens, wherein the first machine learning model is trained to output the candidate locations and entity types for the instances, wherein:

the output does not identify content of individual language tokens within the instances, the first machine learning model comprises one or more convolutional neural network layers, one or more location refinement layers, one or more region-of-interest pooling layers, and a plurality of classifier layers corresponding to respective ones of the plurality of entity types, including the at least some entity types, the one or more region-of-interest pooling layers perform pooling using the image to generate region maps, the plurality of classifier layers determines the entity types for the instances using the region maps, and the one or more location refinement layers refine region maps associated with the entity types to determine the candidate locations;

training a relation detection machine learning model to provide hierarchical relationship information indicating parent-child relationships between the instances of the individual ones of the plurality of entity types identified by the first machine learning model using the refined region maps associated with the entity types and one or more language tokens identified by another machine learning model at the refined region maps;

storing a trained version of the first machine learning model and the relation detection machine learning model; and in response to a programmatic request indicating a target document, providing, using at least the trained version of the first machine learning model, an indication of contents of the target document, including at least one instance of an entity type of the plurality of entity types, and the hierarchical relationship information between the instances of the individual ones of the plurality of entity types, wherein the hierarchical relationship information between the instances of the individual ones of the plurality of entity types are determined based on the one or more language tokens for the contents and region maps associated with the individual ones of the plurality of entity types.

7. The method as recited in claim 6, further comprising performing, at the one or more computing devices:

training a second machine learning model to recognize one or more tokens at one or more of the candidate locations identified by the first machine learning model, wherein the indication of contents of the target document is obtained using trained versions of the first and second machine learning models.

8. The method as recited in claim 6, further comprising performing, at the one or more computing devices:

obtaining, via a programmatic interface, an indication of at least one entity type of the plurality of entity types prior to the training of the first machine learning model.

9. The method as recited in claim 6, wherein the plurality of entity types includes one or more of: (a) a date type, (b) a signature type, (c) a handwriting type, (d) a URL (Uniform Resource Locator) type, (e) a URI (Uniform Resource Identifier) type, (f) an email type, (g) an alphanumeric string type, (h) a single character type, (i) an address type, (j) a postal code type, (k) a phone number type, (l) a table type, (m) a table cell type, (n) an image type, (o) an equation type, (p) an emoji type, (q) a currency symbol, (r) a document layout information element type, or (s) a custom entity type indicated via a programmatic interface by a client of a document analysis service.

10. The method as recited in claim 6, wherein the indication of the contents of the target document comprises an indication of a containment relationship between a first instance of a first entity type and a second instance of a second entity type.

11. The method as recited in claim 6, wherein the indication of the contents of the target document comprises an indication of an image detected within the representation of the document.

12. The method as recited in claim 6, wherein the indication of the contents of the target document (a) comprises an indication of at least a first entity type, wherein a candidate location of an instance of the first entity type was detected by the trained version of the first machine learning model, and (b) does not provide an indication of a language token recognized within the candidate location.

13. The method as recited in claim 6, further comprising performing, at the one or more computing devices:

providing a confidence metric associated with the indication of the contents of the target document.

14. The method as recited in claim 6, wherein the plurality of entity types includes a first entity type and a second entity type, the method further comprising performing, at the one or more computing devices:

training a plurality of entity type-specific content recognition models, including a first content recognition model corresponding to the first entity type and a second content recognition model corresponding to the second entity type, wherein individual ones of the entity type-specific content recognition models are trained to recognize one or more tokens at the candidate locations identified by the first machine learning model, and wherein the indication of contents of the target document is obtained using (a) a trained version of the first machine learning model and (b) respective trained versions of one or more of the first and second content recognition models.

15. The method as recited in claim 6, further comprising performing, at the one or more computing devices:

obtaining, via a programmatic interface, an indication of one or more hyper-parameters of at least the first machine learning model.

16. One or more non-transitory computer-accessible storage media storing program instructions that when executed on or across one or more processors cause one or more computer systems to:

determine a plurality of entity types whose instances are to be detected within a representation of a document, wherein the plurality of entity types comprises at least some entity types whose instances comprise language tokens;

train a first machine learning model to detect, within the representation of the document, candidate locations of instances of individual ones of the plurality of entity types, including the at least some entity types whose instances comprise the language tokens, wherein:

the first machine learning model is trained to output the candidate locations and entity types for the instances, wherein the output does not identify content of individual language tokens within the instances, the first machine learning model comprising:

a plurality of classifier layers corresponding to respective ones of the plurality of entity types, including the at least some entity types, one or more convolutional neural network layers, one or more region-of-interest pooling layers, the one or more region-of-interest pooling layers perform pooling using the image to generate region maps, the plurality of classifier layers determines the entity types for the instances using the region maps, and the one or more location refinement layers refine region maps associated with the entity types to determine the candidate locations;

train a relation detection machine learning model to provide hierarchical relationship information indicating parent-child relationships between the instances of the individual ones of the plurality of entity types identified by the first machine learning model using the refined region maps associated with the entity types and one or more language tokens identified by another machine learning model at the refined region maps;

store a trained version of the first machine learning model and the relation detection machine learning model; and in response to a programmatic request indicating a target document, provide, using at least the trained version of the first machine learning model, an indication of contents of the target document and the hierarchical relationship information between the instances of the individual ones of the plurality of entity types, wherein the hierarchical relationship information between the instances of the individual ones of the plurality of entity types are determined based on the one or more language tokens for the contents and region maps associated with the individual ones of the plurality of entity types.

17. The one or more non-transitory computer-accessible storage media as recited in claim 16, storing further program instructions that when executed on or across one or more processors further cause one or more computer systems to:

train a second machine learning model to recognize one or more language tokens at one or more of the candidate locations identified by the first machine learning model, wherein the indication of contents of the target document is obtained using trained versions of the first and second machine learning models.

18. The one or more non-transitory computer-accessible storage media as recited in claim 16, storing further program instructions that when executed on or across one or more processors further cause one or more computer systems to:

obtain, via a programmatic interface, an indication of at least one entity type of the one or more entity types.

19. The one or more non-transitory computer-accessible storage media as recited in claim 16, wherein the indication of the contents of the target document comprises an indication of a containment relationship between a first instance of a first entity type and a second instance of a second entity type.

20. The one or more non-transitory computer-accessible storage media as recited in claim 16, wherein the plurality of one or more entity types includes a first entity type and a second entity type, and wherein the one or more non-transitory computer-accessible storage media stores further program instructions that when executed on or across one or more processors further cause one or more computer systems to:

train a plurality of entity type-specific content recognition models, including a first content recognition model corresponding to the first entity type and a second content recognition model corresponding to the second entity type, wherein individual ones of the entity type-specific content recognition models are trained to recognize one or more tokens at the candidate locations identified by the first machine learning model, wherein the indication of contents of the target document is obtained using (a) a trained version of the first machine learning model and (b) respective trained versions of one or more of the first and second content recognition models.

* * * * *